(12) United States Patent
Ichikawa et al.

(10) Patent No.: US 12,378,615 B2
(45) Date of Patent: Aug. 5, 2025

(54) BLAST FURNACE OPERATION METHOD

(71) Applicant: JFE STEEL CORPORATION, Tokyo (JP)

(72) Inventors: Kazuhira Ichikawa, Tokyo (JP); Yasukazu Hayasaka, Tokyo (JP); Yohei Kitamura, Tokyo (JP); Natsuo Ishiwata, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 456 days.

(21) Appl. No.: 17/921,208

(22) PCT Filed: Apr. 21, 2021

(86) PCT No.: PCT/JP2021/016163
§ 371 (c)(1),
(2) Date: Oct. 25, 2022

(87) PCT Pub. No.: WO2021/230027
PCT Pub. Date: Nov. 18, 2021

(65) Prior Publication Data
US 2023/0175085 A1  Jun. 8, 2023

(30) Foreign Application Priority Data

May 15, 2020  (JP) ................. 2020-085674

(51) Int. Cl.
*C21B 9/08* (2006.01)
*C21B 7/16* (2006.01)
(Continued)

(52) U.S. Cl.
CPC .......... *C21B 9/08* (2013.01); *C21B 7/16* (2013.01); *F27B 1/16* (2013.01); *F27D 13/00* (2013.01)

(58) Field of Classification Search
CPC .......... C21B 9/08; C21B 7/16; C21B 5/003; C21B 7/12; F27B 1/16; F27D 13/00; Y02P 10/20
See application file for complete search history.

(56) References Cited

U.S. PATENT DOCUMENTS

2016/0083810 A1  3/2016  Kuhl

FOREIGN PATENT DOCUMENTS

| CN | 105368995 A | 3/2016 |
| CN | 105755192 A | 7/2016 |

(Continued)

OTHER PUBLICATIONS

JP 5904344 B2: Espacenet English machine translation (Year: 2016).*
Dec. 6, 2021 Office Action issued in Taiwan Patent Application No. 110116694.
(Continued)

*Primary Examiner* — Adil A. Siddiqui
(74) *Attorney, Agent, or Firm* — Oliff PLC

(57) ABSTRACT

A blast furnace operation method comprising a blast furnace to start up smoothly and perform operation after suspending air blowing by removing as much as possible residual coke that remains inside the furnace during suspension of air blowing and becomes an obstacle to discharging solidified matter. In this blast furnace operation method, air blowing is suspended with the height of a surface of a raw material-filled layer immediately above a blast-furnace tuyere reduced below the height of an upper end of a blast-furnace bosh and then air blowing is resumed. After air blowing into the blast furnace is suspended, oxygen or oxygen and a combustible gas are blown in through a burner inserted into a taphole to combust coke remaining inside the furnace and reduce the volume of residues inside the furnace, and after new coke is charged to a region where the volume decreased, air is blown through a tuyere.

2 Claims, 3 Drawing Sheets

(51) Int. Cl.
*F27B 1/16* (2006.01)
*F27D 13/00* (2006.01)

(56) References Cited

FOREIGN PATENT DOCUMENTS

| | | |
|---|---|---|
| CN | 107254560 A | 10/2017 |
| CN | 107475470 A | 12/2017 |
| EA | 201690017 A1 | 5/2016 |
| JP | H05-171231 A | 7/1993 |
| JP | 2013-221184 A | 10/2013 |
| JP | 2016-030833 A | 3/2016 |
| JP | 5904344 B2 * | 4/2016 |
| JP | 2017-061716 A | 3/2017 |
| JP | 2017-193771 A | 10/2017 |
| KR | 10-2014-0060877 A | 5/2014 |
| RU | 2009 100 518 A | 7/2010 |
| WO | 2016/030833 A1 | 3/2016 |

OTHER PUBLICATIONS

Jun. 8, 2021 International Search Report issued in Patent Application No. PCT/JP2021/016163.
Jun. 22, 2023 Office Action issued in Russian Patent Application No. 2022129031.
Jun. 22, 2023 Search Report issued in Russian Patent Application No. 2022129031.
Van Oudenallen, R. et al., "Blow-in of blast furnaces after long stops," Technik + Trends, Jan. 19, 2010, pp. 47-54.
Sep. 29, 2023 extended Search Report issued in European Patent Application No. 21804826.2.
Aug. 2, 2024 Office Action issued in Korean Patent Application No. 10-2022-7039539.
Jan. 10, 2024 Office Action issued in Chinese Patent Application No. 202180033998.3.
Lei, Y. et al., "Rapid handling of the 1880 m3 blast furnace hearth cooling accident in Laigang No. 1," Ironmaking, vol. 35, No. 1, Feb. 2016, pp. 44-46.

* cited by examiner

Demensionless burner leading
end position from center (-)

Coke replacement rate at lower part (-)

BLAST FURNACE OPERATION METHOD

TECHNICAL FIELD

The present invention relates to a blast furnace operation method in which the operation is stopped to suspend air blowing into a blast furnace and then the air blowing is resumed.

BACKGROUND ART

A blast furnace is a facility in which iron ore is heated, reduced, and melted by a high-temperature reducing gas generated by reactions among high-temperature air and oxygen blown in through holes for air blowing called tuyeres, coke, and pulverized coal to thus discharge pig iron and slag as products to the outside of the furnace through a taphole installed under the tuyeres. During normal operation of a blast furnace, reaction heat inside the furnace and heat supply through the tuyeres are balanced, which allows stable operation of the blast furnace.

When air blowing into a blast furnace is suspended for a long period of time or a blast furnace is shut down, heat supply into the blast furnace is stopped. Meanwhile, heat release continues due to the difference between the temperature inside the blast furnace and the atmospheric temperature, so that cooling of the inside of the furnace progresses and part of molten matter solidifies. When resuming air blowing, it is necessary to melt a solidified layer inside the furnace and heat a coke layer, through which solidified matter passes, until molten matter can pass through the coke layer. Therefore, when suspending air blowing into the blast furnace for a long term or shutting down the blast furnace with the prospect of resuming operation, the following steps are taken: suspending air blowing with a coke ratio inside the furnace raised; performing thermal compensation up to a point where blowing in of pulverized coal can be started after air blowing; closing other tuyeres than one or two tuyeres above the taphole with a refractory or the like; restricting the amount of molten pig iron slag resulting from air blowing to establish a smooth discharge cycle of small amounts of molten matter; and then opening the tuyeres in adjacent areas and gradually increasing the number of open tuyeres to restore a normal operation state.

As other methods, furnace bottom temperature raising burners have been proposed as a method in which an oxygen gas is blown in through a taphole to combust and heat coal material and pig iron inside a furnace and thereby raise the temperature at a bottom part of the furnace, and as a blast-furnace air blowing starting method in which a burner is installed at a taphole provided at a furnace bottom of a blast furnace to combust fuel and efficiently raise the temperature of the furnace bottom and thereby allow the furnace to start up in a short time after long-term suspension of air blowing (Patent Literatures 1 and 2).

CITATION LIST

Patent Literature

Patent Literature 1: JP-A-2016-30833
Patent Literature 2: JP-A-2013-221184

SUMMARY OF INVENTION

Technical Problem

As described above, to start up a blast furnace after long-term shutdown, it is important to be able to smoothly discharge molten matter present inside the furnace. To this end, it is necessary to reduce the amount of molten matter remaining inside the furnace before long-term shutdown starts, and to allow a melt composed of solidified matter that is melted immediately after start-up, molten matter that results from air blowing, etc. to move smoothly inside the furnace. This in turn makes it necessary to reduce the amount of solidified matter by discharging molten matter inside the furnace as much as possible during shutdown of the blast furnace, and to secure a flow passage for the melt by keeping a large grain size and a high void ratio in a coke layer remaining inside the furnace.

As means for reducing solidified matter having accumulated inside a furnace, burners installed at tapholes as illustrated in Patent Literatures 1 and 2 have been hitherto used. Installing a burner at a taphole and heating the inside of the furnace is effective in reducing the solidified matter to some extent. However, the present inventors have found that simply installing a burner at a taphole and heating does not allow the solidified matter to be sufficiently discharged, and that consequently the furnace cannot always start up successfully after suspending air blowing. Further, we have studied in detail the reason why the solidified matter cannot be sufficiently discharged, and found that a burner installed at a taphole (hereinafter also referred to as a taphole burner) has a particularly high heating effect in regions near the taphole and between the taphole and the tuyere, and that the solidified matter present in other regions is not always smoothly discharged.

As a result of studying the cause of difficulty in discharging the solidified matter, we have learned that coke remaining inside the furnace during suspension of air blowing into the blast furnace has been reduced in grain size through reactions inside the furnace, as well as has a small grain size and a low void ratio due to the presence of coke breeze that is generated by wearing of coke as it moves inside the furnace etc. We have also learned that pig iron, slag, etc. often adhere to coke remaining inside the furnace, and that, as the temperature inside the furnace rises, these adhering materials may melt again and add to the amount of the solidified matter. Thus, we have learned that if, by the time of resumption of air blowing, such a residual coke layer can be replaced with an unreacted coke that is free of adhering materials and has not undergone reactions inside the furnace, the grain size and the void ratio in the coke layer inside the furnace can be increased and a smooth liquid flow can be expected.

One conceivable technique for discharging coke remaining inside the furnace is to, after shutting down the blast furnace, first confirm that the inside of the furnace has cooled to a temperature at which equipment can be carried into the furnace, and then mechanically rake out the coke layer remaining inside the furnace. However, as this technique involves waiting for the inside of the furnace to cool, molten matter is highly likely to solidify firmly, making it difficult to smoothly rake out residues inside the furnace. Another conceivable technique is to combust and thereby consume the coke remaining inside the furnace by high-temperature air from an air-blowing tuyere. However, also this technique cannot consume the coke remaining at a part below the tuyere, i.e., between the tuyere and the taphole. On the other hand, it is also conceivable to combust and thereby consume the coke inside the furnace as much as possible using the burner described in Patent Literature 1 or 2 in a state where the temperature inside the furnace is high before air blowing is suspended. However, we have also learned that, in the case where the burner is used immediately after air blowing is suspended, the burner can be used without being damaged when it has been confirmed that the amount of molten matter remaining inside the furnace is small, but that when this confirmation is not performed, coke may not be sufficiently combusted using the burner as the burner gets damaged by molten matter etc. that has failed to be discharged and remains inside the furnace.

An object of the present invention is to propose a blast furnace operation method that allows a blast furnace to start up smoothly and perform operation after suspending air blowing by removing as much as possible residual coke that remains inside the furnace during suspension of air blowing and becomes an obstacle to discharging solidified matter.

Solution to Problem

The present invention has been developed to solve the above problem. By using the following technique, it is possible to stably start up a blast furnace in blast furnace operation in which air blowing is suspended with a surface of a layer filled with raw material, i.e., contents of the blast furnace, immediately above a blast-furnace tuyere lowered below an upper end of a blast-furnace bosh and then air blowing is resumed.

A blast furnace operation method of the present invention is a blast furnace operation method in which air blowing is suspended with the height of a surface of a raw material-filled layer immediately above a blast-furnace tuyere reduced below the height of an upper end of a blast-furnace bosh and then air blowing is resumed. This method is characterized in that, after air blowing into the blast furnace is suspended, oxygen or oxygen and a combustible gas are blown in through a burner inserted into a taphole to combust coke remaining inside the furnace and reduce the volume of residues inside the furnace, and after new coke is charged to a region where the volume has decreased, air is blown through a tuyere.

Each of the following items is considered to be a preferable aspect of the blast furnace operation method of the present invention:

(1) The burner is inserted such that a burner leading end is set at a position of 0.1 to 0.8 in a dimensionless radius that is 0 at a blast-furnace axial center part and 1 at a blast-furnace hearth wall surface.

(2) The burner is inserted such that a burner leading end is set at a position of 0.1 to 0.7 in a dimensionless radius that is 0 at a blast-furnace axial center part and 1 at a blast-furnace hearth wall surface.

(3) The burner has a double-pipe structure including an inner pipe and an outer pipe through which gas flows and has a cap, the cap covering end portions of the inner pipe and the outer pipe, the cap having such a structure that, when the cap is present, gas blown in from the inner pipe is discharged from the outer pipe without leaking to an outside or gas blown in from the outer pipe is discharged from the inner pipe without leaking to the outside, and when the cap is not present, gas blown in from the inner pipe or the outer pipe is discharged from the end portion of the inner pipe or the outer pipe to the outside of the burner, the cap being removable inside the blast furnace.

Advantageous Effects of Invention

The blast furnace operation method of the present invention makes it possible to stably start up a blast furnace in blast furnace operation in which air blowing is suspended with a surface of a raw material-filled layer immediately above a blast-furnace tuyere lowered below an upper end of a blast-furnace bosh and then air blowing is resumed.

DESCRIPTION OF EMBODIMENT

Figure 1:
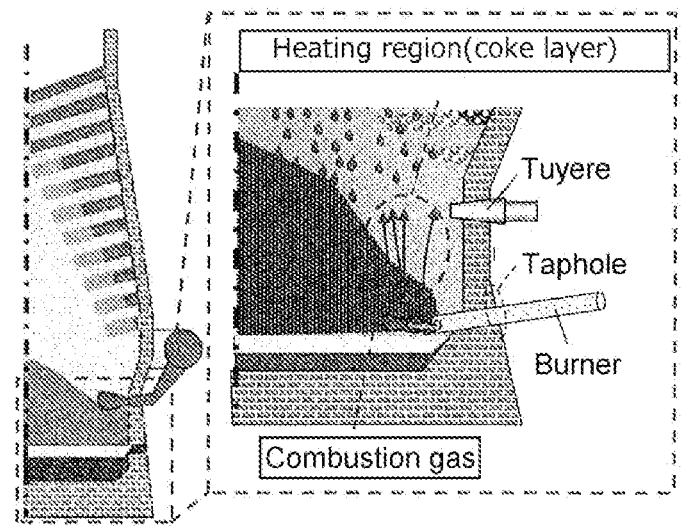
FIG. 1 is a schematic view of a lower part of a furnace in the case where a taphole burner is used.

FIG. 1 shows a schematic view of a lower part of a furnace in the case where a taphole burner is used in the present invention. In the present invention, first, a taphole, which is normally closed with a material called mud material, is opened to insert the burner into the furnace. To open the taphole, a commonly known taphole opener can be used. After the taphole for inserting the burner is opened, the burner is inserted.

Figure 2A:
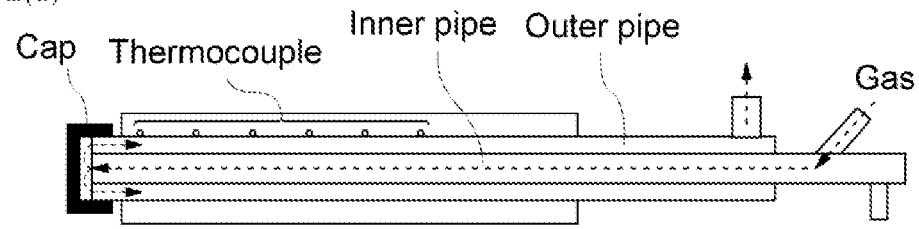
FIGS. 2(a) and (b) are each a schematic view of a burner used in the present invention.
Figure 2B:
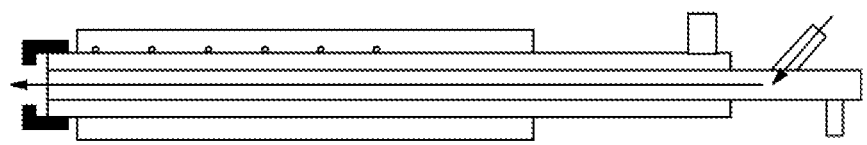

FIG. 2 shows schematic views of the burner used in the present invention. The burner shown in FIGS. 2 (a) and (b) has a double-pipe structure composed of an inner pipe and an outer pipe through which gas flows, and has a cap that covers end portions of the inner pipe and the outer pipe and a thermocouple that is provided on an outside of the outer pipe and measures the temperature of the burner. As shown in FIG. 2 (a), when the cap is present, gas blown in through a gas introduction port of the inner pipe is discharged through a gas discharge port of the outer pipe without leaking to an outside. On the other hand, as shown in FIG. 2 (b), when the cap is not present, gas blown in through the gas introduction port of the inner pipe is supplied into the furnace. Thus, the burner has a function of cooling itself by allowing gas to flow from the inner pipe to the outer pipe in the presence of the cap, and therefore can be stably inserted into the furnace.

Combustion is started by stopping cooling through the flow of gas from the inner pipe to the outer pipe to melt and thereby remove the cap, and blowing a gas for combustion into the furnace, for example, through the inner pipe of the burner, while blowing in an oxygen-containing gas as a supporting gas through the outer pipe. When the temperature of a leading end portion of the burner exceeds a combustion start temperature (approximately 800° C.) of coke present around the leading end portion, the gas blown in through the burner is switched to only the oxygen-containing gas to combust the coke. While it is most preferable to blow in pure oxygen as the oxygen-containing gas, a gas with an oxygen concentration lower than 100% may also be used if combustion of coke can be continued. In this case, some amount of combustion gas may be continually blown in, or to protect the burner from the temperature inside the furnace and cool the burner, an inert gas or a gas with a low oxygen concentration may be blown in at the same time. While a mechanism in which gas flows from the inner pipe to the outer pipe is illustrated in FIG. 2 (a), a mechanism in which gas flows from the outer pipe to the inner pipe may be adopted. When blowing in gas to cool the burner, it is preferable that the gas be blown in through the outer pipe of the burner.

Figure 3:
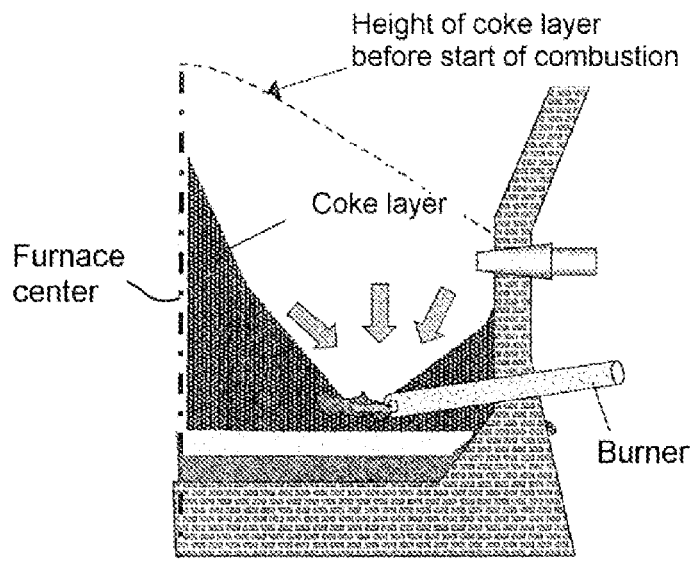
FIG. 3 is a schematic view of a state where residual coke has been combusted using the taphole burner.
Figure 4:
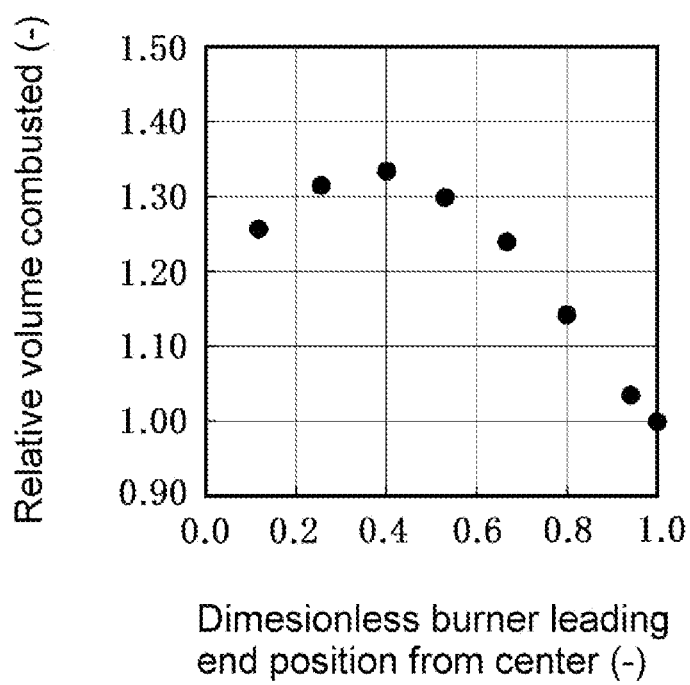
FIG. 4 is a graph showing a relationship between a burner leading end position and a combustible volume.
Figure 5:
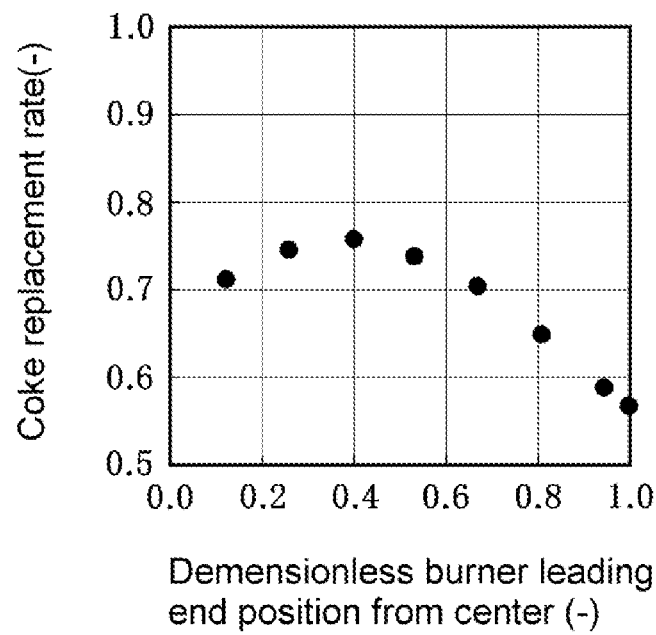
FIG. 5 is a graph showing a relationship between the burner leading end position and a replaceable coke ratio.

The efficacy of combusting residual coke at a lower part of a blast furnace by a burner and replacing it with unused new coke was evaluated using a test device imitating a lower part of a blast furnace. First, the position to insert the burner was studied. FIG. 3 shows a schematic view of a state where residual coke has been combusted using the burner. As shown in this schematic view, when coke is burned up by combustion, additional coke rolls into an apex of the resulting vacant space in accordance with an angle of repose, and this additional coke is combusted and disappears. As this process is repeated, the volume decreases. FIG. 4 shows a combustible coke volume based on this mechanism. Here, the relationship between the burner leading end position and the combustible coke volume is represented as a relationship between the burner leading end position as a dimensionless burner leading end position (from the center) in a dimensionless radius that is 0 at a center position of the blast furnace and 1.0 at a blast-furnace hearth wall surface (tuyere part), and a relative volume combusted with 1.00 being a combustible coke volume when the burner leading end position is 1.0 (tuyere part). It can be seen from this graph that the combustible coke volume is not less than 1.1 times larger than the blast-furnace hearth wall surface when the dimensionless radius that is 0 at a blast-furnace axial center part and 1 at the blast-furnace hearth wall surface is 0.8, and that the combustion region can be maximized at a dimensionless radius of 0.4. FIG. 5 shows a replacement rate in the case where the combustion region is replaced with new coke. As in FIG. 4, a peak is reached at 0.4. Here, the replacement rate is (the volume of new coke layer having replaced the combustion region)/(the volume of the coke layer before combustion).

Figure 6:
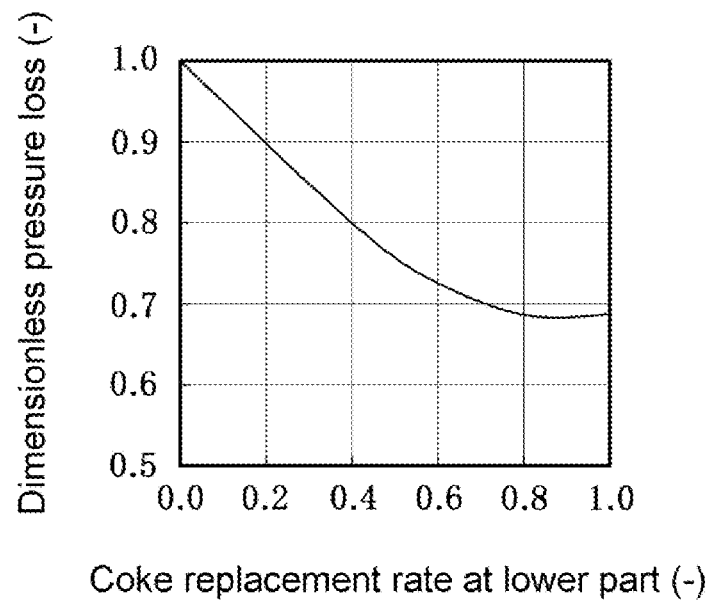
FIG. 6 is a graph showing a relationship between the replaceable coke ratio and a pressure loss.

The efficacy of replacing coke between a tuyere and a taphole was confirmed using a similar device based on this replacement rate. In this case, a pressure loss resulting from replacing coke was measured and the measured pressure loss was used as an evaluation index for gas and liquid permeability of a coke layer. FIG. 6 shows a measurement result. It can be seen that the pressure loss can be reduced when the coke replacement rate at a lower part (between the tuyere and the taphole) (hereinafter referred to as a coke replacement rate) is set to not less than 0.7. Note that the axis of ordinate of FIG. 6 represents a pressure loss turned into a dimensionless value, and shows a relative value with 1.0 being the value of the pressure loss of the coke layer at the coke replacement rate=0. Thus, a ratio of each of the pressure losses of the coke layer at various replacement rates measured under the same conditions relative to the pressure loss at the coke replacement rate=0 is used as the pressure loss turned into a dimensionless value (dimensionless pressure loss).

As can be seen from these results, to reduce the pressure loss and secure the gas and liquid permeability of the coke layer, it is desirable to set the coke replacement rate to not less than 0.65, and that the burner insertion position that can achieve this coke replacement rate is within the range of 0.1 to 0.8 in the dimensionless radius that is 0 at the blast-furnace axial center part and 1 at the blast-furnace hearth wall surface. It is further desirable to set the coke replacement rate to not less than 0.70, and the burner insertion position that can achieve this coke replacement rate is within the range of 0.1 to 0.70 in the dimensionless radius that is 0 at the blast-furnace axial center part and 1 at the blast-furnace hearth wall surface.

As can be seen from this result, in blast furnace operation in which air blowing is suspended with the raw material-filled layer immediately above the blast-furnace tuyere lowered below the upper end of the blast-furnace bosh, it is possible to stably start up the blast furnace after long-term shutdown by, after suspending air blowing into the blast furnace, blowing in a combustible gas and/or oxygen by a burner inserted into the taphole to combust coke remaining inside the furnace, and charging unused coke to the region of combustion to increase the liquid permeability of the coke layer and reduce the amount of residues inside the furnace. In this case, it is preferable that the coke replacement rate be set to not less than 0.65, and it is further preferable that the coke replacement rate be set to not less than 0.70. Moreover, it is preferred that the burner be inserted such that the burner leading end is set to a position of 0.1 to 0.8 in a dimensionless radius that is 0 at the blast-furnace axial center part and 1 at the blast-furnace hearth wall surface, and it is further preferred that the burner be inserted such that the burner leading end is set to a position of 0.1 to 0.70. When dust deposition on a raw material surface layer is recognized in a case such as where the period from suspension of air blowing to combustion by the burner is prolonged, combustion by the burner may be performed after dust is removed as necessary.

EXAMPLES

Example 1

In a blast furnace with an inner capacity of 5000 m$^3$, air blowing was suspended with the height of an upper surface of a raw material-filled layer inside the furnace immediately above a tuyere reduced to a level 1 m below an upper end of a blast-furnace bosh. Before the furnace is started up after suspension of air blowing, the burner of FIG. 2 was installed in the taphole such that the leading end is set to the position of 0.4 in a dimensionless radius inside the furnace. First, LNG and oxygen were blown in to combust coke, and at a point when the temperature of the coke exceeded 800° C., the gas to be blown in was switched to all oxygen to combust the coke. When coke is present at the leading end of the burner, most of the oxygen blown in is consumed by combustion, but when coke at the leading end of the burner is lost and a state like that of the coke layer of FIG. 3 is created, the amount of oxygen consumed decreases. Therefore, to what extent the coke has been consumed can be found by measuring the oxygen concentration inside the furnace. After a rise in the oxygen concentration inside the furnace was confirmed, blowing in of oxygen from the taphole burner was stopped and unused coke was charged from an upper part of the blast furnace. Combustion by the taphole burner was resumed to heat the newly charged coke. At a point when the temperature of the coke at the leading end portion of the tuyere exceeded 2000° C., hot air of 1100° C. was blown through the tuyere and the combustion was switched to heating from the tuyere. When thus started up, the blast furnace was able to smoothly discharge molten matter inside the furnace and favorably reach a steady operation state.

Example 2

In a blast furnace with an inner capacity of 5000 m$^3$, air blowing was suspended with the height of an upper surface of a raw material-filled layer inside the furnace immediately above a tuyere reduced to a level 1 m below an upper end of a blast-furnace bosh. Before the furnace was started up after suspension of air blowing, the burner of FIG. 2 was installed such that the leading end is set to the position of 0.6 in a dimensionless radius inside the furnace, and oxygen was blown in and combusted for 48 hours to combust coke. Combusting the coke using burners respectively installed in four tapholes could replace about 60% of the coke inside the furnace, and thus good start-up was achieved.

COMPARATIVE EXAMPLE

In the same blast furnace as in Examples, the taphole burner was installed such that the leading end was set to the position of 0.95 in a dimensionless radius. After the region between the taphole and the tuyere was heated by combustion of the taphole burner, this combustion was switched to blowing of hot air through the tuyere and an attempt to start up the blast furnace was made. A case where molten matter was not smoothly discharged occurred 30% of the time.

In view of the fact that molten matter inside the furnace was smoothly discharged in most of the examples of the method of the present invention, the method of the present invention is deemed to contribute to smooth start-up of a blast furnace.

INDUSTRIAL APPLICABILITY

The blast furnace operation method according to the present invention can be provided as a stable operation method not only for resuming operation of a blast furnace but also for various vertical melting furnaces other than blast furnaces.

The invention claimed is:

1. A method of operating a blast furnace in which air blowing is suspended, wherein at the time of suspension, a height of a surface of a raw material-filled layer is above a blast-furnace tuyere and below a height of an upper end of a blast-furnace bosh, the method including:

after air blowing into the blast furnace is suspended, blowing oxygen or oxygen and a combustible gas into the blast furnace through a burner inserted into a taphole to combust coke remaining inside the furnace and reduce a volume of residues inside the furnace, and blowing air through the tuyere after new coke is charged to a region where the volume has decreased, wherein the burner is inserted such that a burner leading end is set at a position of 0.4 in a dimensionless radius that is 0 at a blast-furnace axial center part and 1 at a blast-furnace hearth wall surface.

2. The blast furnace operation method according to claim 1, wherein, the burner has a double-pipe structure including an inner pipe and an outer pipe through which gas flows and has a cap covering end portions of the inner pipe and the outer pipe having such a structure that, when the cap is present, gas blown in from the inner pipe is discharged from the outer pipe without leaking to an outside or gas blown in from the outer pipe is discharged from the inner pipe without leaking to the outside, and when the cap is not present, gas blown in from the inner pipe or the outer pipe is discharged from the end portion of the inner pipe or the outer pipe to the outside of the burner, the cap being removable inside the blast furnace.

* * * * *